United States Patent Office 2,987,187
Patented June 6, 1961

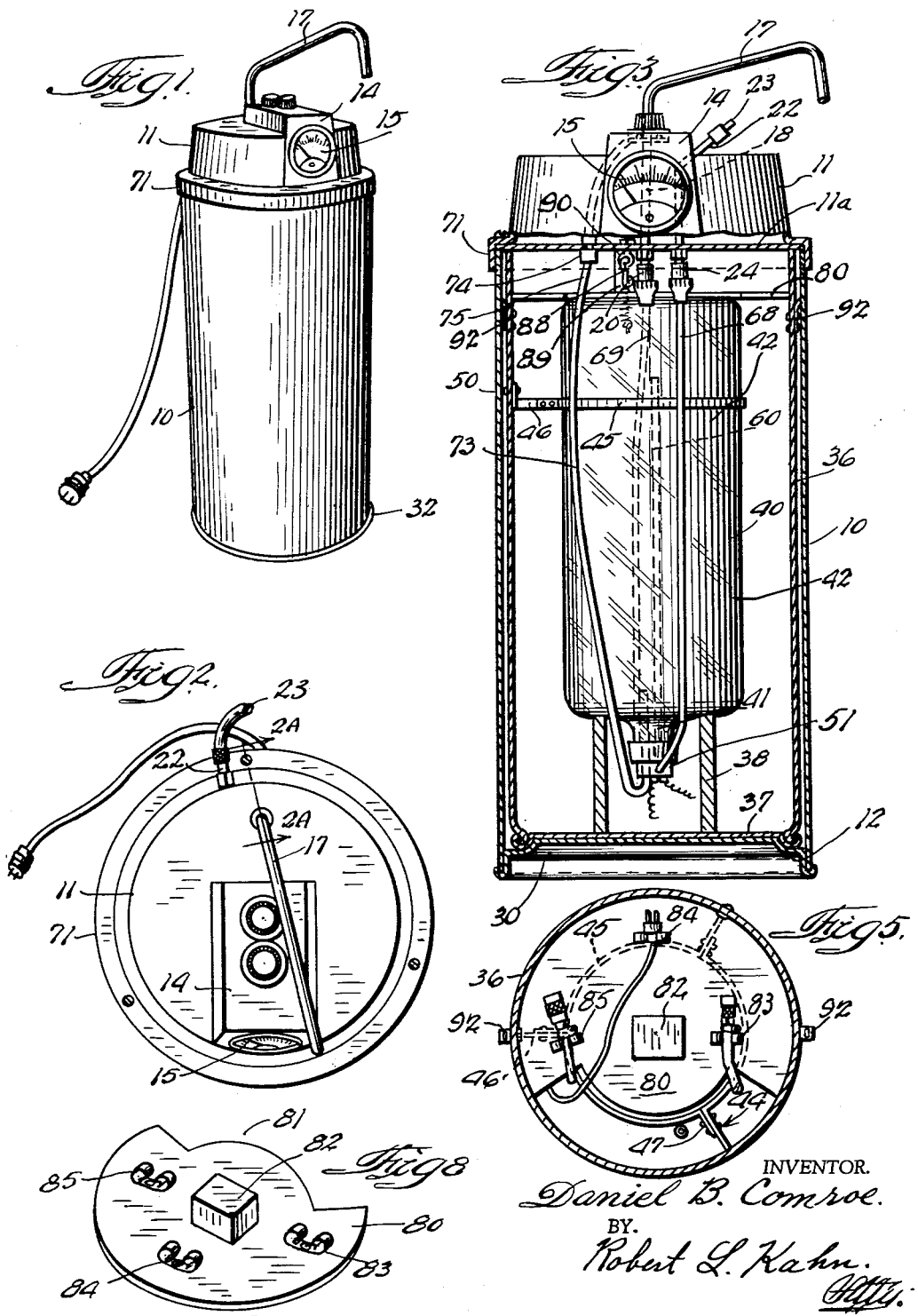

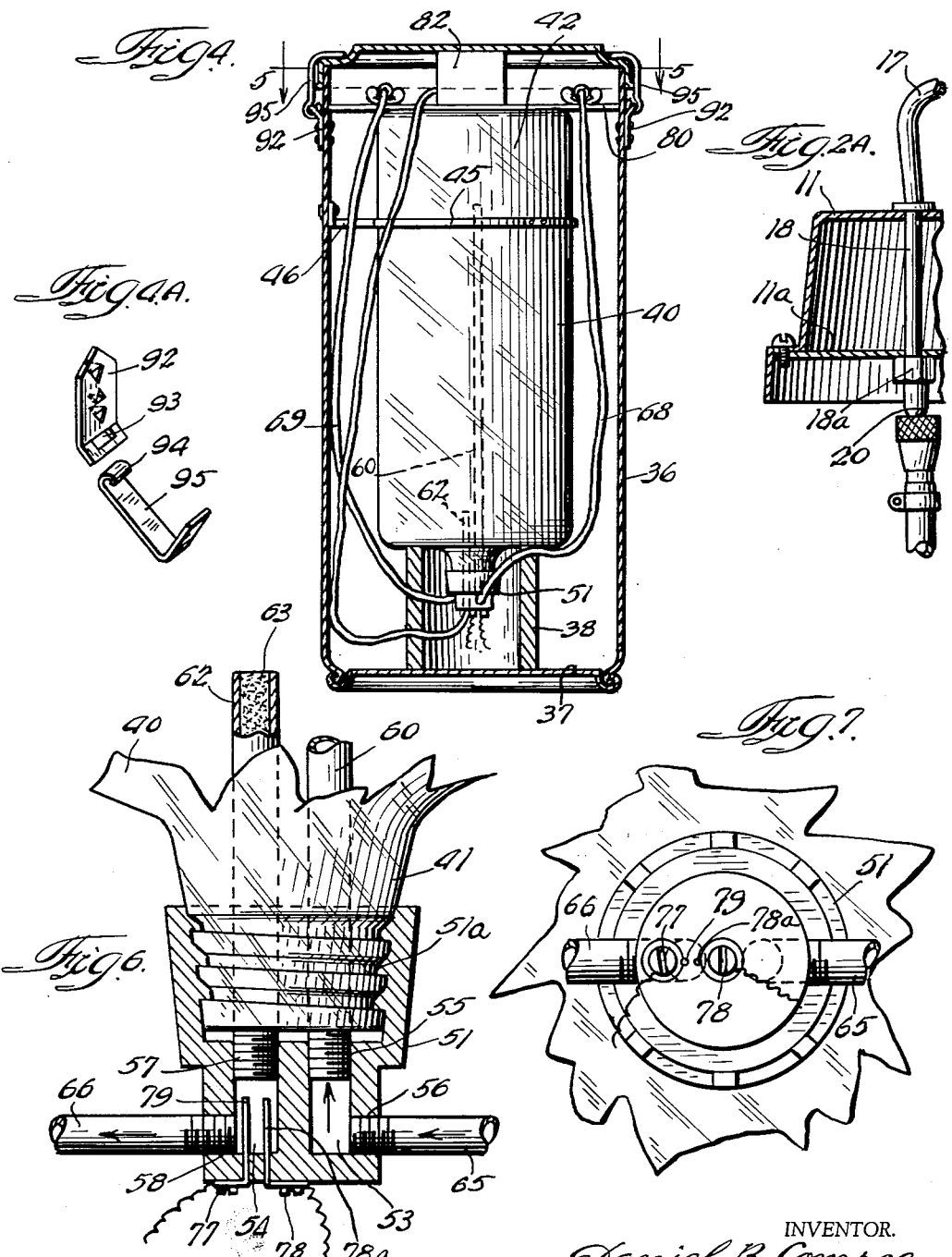

2,987,187
WATER PURIFIER
Daniel B. Comroe, 5208 S. Lake Park Ave.,
Chicago 15, Ill.
Filed Feb. 27, 1958, Ser. No. 717,947
3 Claims. (Cl. 210—244)

This invention relates to a water purifier and more particularly to a demineralizer having a readily replaceable cartridge containing the purifying element.

Demineralizers for purifying water are well known and generally include certain resins having ion-exchange properties. As a rule, the water to be demineralized is forced through a bed of suitable resin material. The resin material is usually quite expensive and requires rejuvenation or replacement after demineralizing a substantial quantity of water having a mineral content. In many installations, particularly where demineralized water is used in relatively small quantities, it is impractical to rejuvenate the resin material at the place of use and generally it is desirable to ship the resin material to a processor for rejuvenation.

This invention provides a construction whereby a package containing the active purifying agent is in a ready form and may be easily used or shipped or replaced with a minimum of trouble. While the invention may have other applications it is particularly useful in connection with a small demineralizer and provides a construction including a cartridge which may be conveniently and expeditiously handled and used. Other advantages flowing from the use of the invention will be obvious following a description of the invention.

Referring now to the drawings—

FIG. 1 is an elevation of a demineralizer embodying the present invention.

FIG. 2 is a top view of the device illustrated in FIG. 1.

FIG. 2A is a sectional detail on line 2A—2A of FIG. 2.

FIG. 3 is a sectional elevation of the device illustrated in FIG. 1.

FIG. 4 is a view partly in section of the cartridge in condition for shipment.

FIG. 4A is a perspective detail of the clasp used in retaining the cover on the carton.

FIG. 5 is a view partly in section showing the carton of FIG. 4 with the top removed.

FIG. 6 is an enlarged sectional detail of the bottom of the resin container illustrating the position of the inlet and outlet pipes.

FIG. 7 is a bottom view of the resin container with the cover and inlet and outlet pipes in position.

FIG. 8 is a perspective detail of a plate in the carton for anchoring the ends of the pipes and wires during shipment.

The invention in general comprises a water purifying unit or demineralizer wherein there is disposed a resin containing cartridge which may be readily removed and disconnected and ready for shipment in a protected container. The unit preferably includes means for indicating when cartridge replacement is necessary and the cartridge construction is such as to facilitate the removal of a spent cartridge from a unit, shipment of such cartridge for rejuvenation and replacement of a new cartridge in the unit. In order that the invention may be more fully understood, it will now be explained in connection with the drawings.

The entire demineralizing unit comprises sleeve 10 provided with head 11 and base 12. Sleeve 10 is a permanent part of the unit, not to be returned in connection with cartridge rejuvenation. Accordingly, it is desirable to have sleeve 10 made of a material which has a pleasing appearance and will withstand ordinary usage. Sleeve 10 may be of plastic having any desired color and texture and may, for example, be similar to the plastic materials used in making simulated leather bags or valises or the like.

Head portion 11 is also retained by the user and is formed of some durable material such as rubber or some hard plastic. Head 11 includes portion 14 adapted to accommodate electric meter 15. Within portion 14 and to the rear of meter 15 there may be disposed suitable means for measuring the electrical resistance of treated water delivered by the unit. Inasmuch as circuits for measuring such resistances are well known, no detailed showing thereof will be made.

Head 11 has secured therein a pipe consisting of delivery spout 17 and pipe 18. Pipe 18 has threaded part 18a engaged by a nut bearing against panel 11a of head 11 to lock the pipe in position. The bottom end of pipe 18 is provided with nipple 20.

Head 11 also supports intake pipe 22 having nipples 23 and 24 at opposite ends thereof. The various pipes and nipples may be made of any suitable rigid material, preferably non-metallic. However, where a slight mineral content is not objectionable, the various pipes may be made of brass or other metal plated with such inert metal as gold on those surfaces exposed to water. It is preferred, however, to make the various pipes out of inert plastic, such as, for example, polyethylene, Uscolite, nylon, or any other plastic available on the market. Inasmuch as intake pipe 22 handles untreated water, the material used in the manufacture of this pipe is not too important except that such pipe may tend to impose an additional load upon the demineralizer. Referring to the bottom of the unit, base 12 consists of stepped member 30 of rigid material, such as sheet iron or sheet steel. As will be more fully explained later, stepped member 30 may be removed from sleeve 10.

Disposed within sleeve 10 is a removable and replaceable cartridge assembly carried by drum 36. Inasmuch as drum 36 will be used as a shipping container, it is preferably constructed of suitable sturdy material, such as fiber, paper board, or even of sheet metal. However, fiber is preferred for the reason that it is economical and has a high ratio of strength to weight. Drum 36 has bottom 37 upon which is supported sleeve 38 of wood or other cheap material having desired strength. Resting upon the edge of sleeve 38 is container or bottle 40 in which is disposed the ion-exchange resin.

Bottle or container 40 is of suitable material which is inert in the presence of water. While bottle 40 may be of certain types of glass, the relatively great weight of glass makes this material generally unsuitable. Bottle 40 may be of any suitable plastic, such as polyethylene, either of the flexible or rigid type. Bottle 40 is fabricated in the shape of a bottle having neck 41 disposed at the bottom when in normal use. Bottle 40 has portion 42 suitably supported within drum 36. A simple support member consists of a number of metal straps 44 having bottle engaging portions 45 and supporting arms 46. Each strap 44 cooperates with an adjacent strap. Thus each strap 44 has clamping portion 47, which is adapted to be bolted to a part of support portion 46 of an adjacent strap. As shown in the drawing, three separate straps are provided, the bolted portions providing a clamping ring for the bottle while support portions 46 of the straps extend radially from the bottle and engage bolts 50 carried by drum 36. Bolts 50 may be loosened from outside of drum 36 to permit the ready withdrawal of bottle 40 from drum 36 when necessary.

Neck 41 of the bottle is provided with cap 51 also made of suitable material which is inert to water and which also has suitable flexibility. Thus cap 51 may be made of rubber or plastic and may have screw threads 51a molded in the interior thereof to engage corresponding screw threads molded on the exterior of neck 41 of the bottle. Cap 51 contains pipe angles 53 and 54. These angles may either be separate pieces molded into cap 51 or may be formed in the cap interior during molding. Pipe angle 53 is provided with suitable threading 55 and 56. Similarly, pipe angle 54 is provided with suitable threading 57 and 58. Pipe angle 53 has standpipe 60 extending from threaded end 55 into bottle 40 almost to bottom 42 of the bottle. Standpipe 60 may be of polyethylene or nylon or any other suitable material and is adapted to be supplied with water to be demineralized. The discharge end of standpipe 60 may be provided with a finely perforated cap to meter the water intake and function as a filter and flow regulator.

Pipe angle 54 is provided with pipe stub 62 engaging threaded portion 57 of the angle. Pipe stub 62 extends a short distance into bottle 40 and is provided with inert filter 63. Filter 63 may be of glass wool, or other suitable material, and prevents the escape of the resin material stored in bottle 40. Pipe stub 62 will also be of suitable material, such as polyethylene or nylon, and has passing through it the treated water.

Threaded portions 56 and 58 of the pipe angles accommodate fittings 65 and 66, these consisting of short lengths of pipe. These fittings are preferably sufficiently rigid so that a flexible hose may be slipped over each fitting. Thus, fittings 65 and 66 may be of rigid nylon, rigid polyethylene, Bakelite, or any other plastic having reasonable rigidity. Fittings 55 and 56 are provided with rubber hose lengths 68 and 69 respectively. Hose 68 and 69 may be of flexible rubber or of other flexible plastic of desired quality so as not to impart any undesired characteristic to the water. Thus for certain food purposes, rubber is not desirable, instead certain polyethylene or other plastic materials may be used. Hose 68 and 69 are just long enough so that the free ends thereof may be slipped over nipples 24 and 20 respectively. Preferably the various nipples and hose ends are provided with suitable snap or spring fittings to retain the pipe in position against the tendency of water pressure to open the joint. Inasmuch as such fittings are well known, a detailed description thereof is not believed to be necessary.

Head 11 has annular flanged portion 71 which engages the free top edges of sleeve 10. It is necessary that hose 68 and 69 have sufficient length to permit coupling the hose to nipples 24 and 20 while head 11 is tipped sufficiently to permit a hand to be inserted. In addition to hose 68 and 69, a pair of electrical leads 73 extend from cap 51 of the bottle to socket 74 carried by head 11. Leads 73 carry plug 75 at their ends, plug 75 cooperating with socket 74 for establshing a connection.

The plug and socket may either be of the polarized or nonpolarized type.

Leads 73 are attached to terminals 77 and 78 rigidly secured to cap 50. Cap 50 has a pair of electrodes 79 and 78a molded therein, these electrodes extending into outlet angle pipe 54. Electrodes 77 and 78 are inert and may either be of gold plated material or may be of some noble metal, such as platinum, or may be of graphite. In any event, electrodes 77 and 78 are adapted to have a relatively low potential impressed upon them, such potential being less than about 4 volts so that there will be no tendency to contaminate the effluent water by an any electrolytic effects. As a rule, switch means will be provided for disconnecting electrodes 77 and 78 from any source of potential except when it is desired to test the efficacy of the entire unit. As is well known, a fresh demineralizer unit will reduce the ion content of the water to such a degree that the electrical resistance thereof is of a far higher value than is true of untreated water. By thus measuring the resistivity of the effluent water at intervals, a check on the potency of the resin in bottle 40 may be readily obtained. It is understood that the valve for controlling the flow of water will be on the intake line coupled to nipple 23.

Disposed within drum 36 and resting upon the flat bottom of bottle 40 is support plate 80 of wood, fiber or other stiff material. Plate 80 is circular but has a portion cut away to leave region 81. In the center of plate 80 is wooden block 82. Plate 80 has riveted thereto three spring clips 83, 84 and 85. Region 81 in plate 80 allows the hose and cable ends to extend above plate 80, the spring clips serving to clasp the hose and cable ends when these are not connected (FIGS. 4 and 5). Hook 88 carried by spring 89 anchored to drum 36 cooperates with eye 90 carried by panel 11a to retain head 11 in position.

Normally a cartridge is disposed for active use in a unit as illustrated in FIG. 3. In the event that it is desired to replace a resin cartridge, it is necessary to lift or raise head 11 sufficiently to permit disconnecting hook 88 from eye 90 and plug 75 and hose 68 and 69. Head 11 may now be completely removed. The hose and cable ends may be snapped into clips 83 to 85 inclusive. Drum 36 may be raised from its position within sleeve 10. If desired, handles upon the inside edge of drum 36 may be provided or strap portions 46 may be gripped for raising the cartridge. Drum 36 can now stand by itself as illustrated in FIG. 4, with bottle 40 inverted. Sleeve 10 is raised to release bottom member 30. Bottom member 30 may be disposed over the top free edge of drum 36 to form a cover for the drum. Block 82 will provide support for cover 30 or panel 11a in all cases. Preferably bottom member 30 has its edge crimped so that a tight fit will be established when the cover is applied to drum 36. Drum 36 carries a number of spring anchors 92 on the outside thereof just below the top of the drum. Each anchor 92 has eye 93 into which may be threaded finger 94 of locking clip 95. Locking clips 95 will retain cover 30 firmly in place. Drum 36 may have a shipping label suitably attached thereto and the entire unit including bottle 40 will be ready for return to the manufacturer. Before shipping the cartridge it may be desirable to blow out any excess water with compressed air. It is also possible to invert drum 36 before cover 30 is applied and let the water drain out from hose 68 and 69, or simply seal the bottle and retain whatever water may be left.

Upon receipt of a new cartridge the procedure may be reversed. In order to prevent any mixup in the intake and outlet hose connections, it is desirable to provide different couplings or color or label them so that no mistake can be made.

In connection with the choice of materials for the bottle and the various pipes and hose, it is understood that inertness to water is a primary consideration. However, the material of which the bottle is made and also the cap must have a sufficiently high resistance to electricity so that the resistance of the purified water may be measured with substantial accuracy. It is well known that water which has been purified or demineralized by ion-exchange resins may have a resistivity which is even higher than distilled water. A material like polyethylene or Teflon or Uscolite is suitable from both a chemical and electrical angle.

What is claimed is:

1. A portable water purifier cartridge including a bottle for containing a substance which is capable of purifying water passing through the same, said bottle being in one piece of the same material throughout and having a generally cylindrical body and a constricted neck at one end, a cap for sealing the neck, said cap being molded and having a water inlet passage and a separate water outlet passage formed therein, each passage having internal and external ends, a short pipe attached to the internal end of the water outlet passage and extending inside of the bottle neck, a filter at the free end portion of said pipe, said pipe terminating at the region where the neck merges into the body of the bottle so that a substantial portion of the length of the short pipe is within the length of the bottle neck, a longer pipe attached to the internal end of the inlet passage and extending from the cap toward and terminating near the closed other end of the bottle, said two pipes, cap and bottle being of material inert to water, in the normal usable inverted position of said bottle, said longer pipe discharging inlet water near the other end of the bottle whereby said water travels downwardly through said substance to the filter at the free end of said short pipe, the filter keeping back the water purifying substance, said cap being adapted to have hose connected to the external ends of said two passages for supplying water to the bottle and withdrawing purified water for use, the normal water flow paths between the open end of the longer pipe and filter end of the short pipe passing through substantially all of the purifying substance.

2. The construction according to claim 1 in combination with an outer cylindrical housing, a removable outer top for said housing, said removable outer top carrying water inlet and water outlet fixtures, the bottom of said outer housing having a separable base upon which said housing can stand, an inner housing within said outer housing, said inner housing having a bottom and cylindrical wall firmly joined and having an open top, a support at the bottom of said inner housing upon which the body of the bottle adjacent the neck can rest and be supported in a normal usable inverted position within said inner housing, flexible hose extending between said cap and the removable outer top for coupling to said fixtures, said hose being readily disconnectable at one end thereof, said separable base upon which the outer housing normally rests being dimensioned and shaped so that it fits as a cover for the inner housing to completely close the same, said inner housing and cover being sufficiently strong to function as a shipping container, said inner housing and bottle requiring minimum customer handling incident to use and servicing of the entire combination.

3. The construction according to claim 2 wherein said cap is of a material having an electrical resistance higher than that of distilled water, said cap having a pair of electrodes sealed into the cap material and having chemically inert active electrode portions extending into the water outlet passage, said electrodes having terminal portions at the outside of the cap for ready connection to a resistance measuring system and wherein said removable outer top carries a resistance measuring system.

References Cited in the file of this patent

UNITED STATES PATENTS

| | | |
|---|---|---|
| 1,195,427 | Wider | Aug. 22, 1916 |
| 2,061,714 | Pick | Nov. 24, 1936 |
| 2,061,715 | Pick | Nov. 24, 1936 |
| 2,170,975 | Pick | Aug. 29, 1939 |
| 2,304,453 | Gudmundsen | Dec. 8, 1942 |
| 2,370,190 | Ralston | Feb. 27, 1945 |
| 2,371,444 | Hubert | Mar. 13, 1945 |
| 2,628,191 | Sard | Feb. 10, 1953 |
| 2,647,871 | Frazier | Aug. 4, 1953 |
| 2,761,832 | Robb et al. | Sept. 4, 1956 |
| 2,781,312 | Klumb et al. | Feb. 12, 1957 |